Aug. 15, 1944.  W. DUBILIER  2,355,635
SCREEN OR WEBBING MATERIAL
Filed March 16, 1940   2 Sheets-Sheet 1

INVENTOR.
William Dubilier
BY
ATTORNEY.

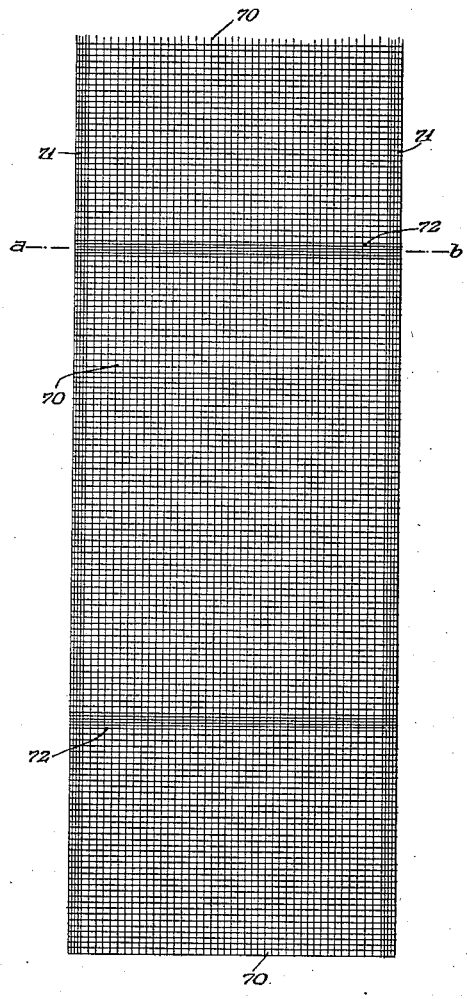

Patented Aug. 15, 1944

2,355,635

UNITED STATES PATENT OFFICE 2,355,635

SCREEN OR WEBBING MATERIAL

William Dubilier, New York, N. Y.

Application March 16, 1940, Serial No. 324,415

8 Claims. (Cl. 139—420)

This invention relates to a screen cloth or mesh for use in connection with furniture and furniture construction, and relates to a reticular material composed primarily of single strands of thermo-setting or thermo-plastic, synthetic resins and more specifically the invention relates to the use of open mesh flexible and elastic screen cloth composed of permanently crimped nylon warp and weft strands, the perimeter of which screen cloth is bound and fixed in desired permanent position by binding means.

This composite screen thus formed may be utilized in furniture and furniture construction.

The actual screen structure itself is more particularly described in the copending application of H. W. Thomas, S. N. 265,114 filed March 31, 1939 and also in the copending application of the said H. W. Thomas for screen material and method of making same, Serial No. 324,393, filed simultaneously herewith.

The novel screen material which is to be bound and arranged in accordance with the present invention and which is to be manufactured and utilized in connection with furniture construction both for interior webbing and support and for exterior support and appearance is formed in accordance with both of the applications above mentioned.

This screen material comprises essentially an open mesh reticular screen structure made from thermo-setting or thermo-plastic, non-metallic, non-vegetable, non-animal, fibers or strands, preferably single filament strands, for reasons set forth in the aforementioned applications. The material of which these strands are made is moisture resistant, not affected by common acids or alkalis, non-oxidizable, weather resistant and may be opaque, translucent, transparent or may be colored in any desired manner.

The strands thereof may be composed wholly of synthetic polymerization products including vinyl resins, nylon, vynon, aldehyde condensation products, cellulose derivatives, alsifilms and other similar thermo-plastic or thermo-setting synthetic materials.

In the manufacture of the screen cloth or mesh, the said materials, preferably in the form of single filament strands, are either first woven into the form of a screen or mesh and then thermally crimped so that complementary crimps in intersecting strands engage each other to resiliently maintain the strands in predetermined mesh relation; or they are first crimped and then woven into flexible, rollable, screen cloth with complementary crimps in intersecting strands registering with each other, and then given a thermal set so that complementary crimps are also in tight frictional although resilient engagement with each other.

The material is flexible and elastic so that upon the application of tension, the crimps may straighten out, permitting a deformation of the screen in accordance with the pressure or tension created and upon relaxation of said deforming action the crimps will be restored to their original position and the strands returned to their predetermined meshing relation.

The effect thereby obtained is such that even though a large object is forced between or through the mesh, thus deforming or distorting the mesh and driving the strands away from their original mesh-defining relationship, nevertheless upon withdrawal of the large object or other deforming force, the strands will immediately be returned to their original mesh defining relation.

Thus, a pencil may be driven into the mesh, completely enlarging one of the reticular areas to many times its original size and yet upon withdrawal of the pencil, the strands will return to their original undeformed position without any indication visible as to where the pencil might have been inserted.

I have found that this material may have supreme importance in the manufacture and construction of furniture as a netting or "caning" for backs and seats of chairs, as binders for cushions or other materials, as spring supports for furniture of various kinds, as a netting or webbing for use in the interior construction of upholstered furniture and in many other furniture uses which may be suggested by the resiliency and inherent strength of the material.

Since nylon or any similar thermo-setting or thermo-plastic, synthetic resin is alkali and acid resistant, and since its tensile strength may be as high as 51,000 pounds per square inch and since it is resilient, flexible and elastic and since it may be formed in the manner above described in order to utilize the inherent resilient quality thereof, it may readily be used and adapted for furniture construction as a substitute for any metallic webbing or mesh which might have previously been used, as a substitute for any heavy fibrous or burlap webbing or netting and owing to the fact that its appearance may be as pleasing as the user or interior decorator may desire, as a substitute for any "caning" or other similar material which may have previously been used.

In connection with such use for furniture construction, the screen may be bound or framed in the manner and by the materials described in the copending application of H. W. Thomas for screen frames, Serial No. 324,394, filed simultaneously herewith.

An important object of this invention, therefore, is the provision of a synthetic resin screen or cloth of a resilient nature for furniture construction of various types.

Another and further important object of the present invention is the application and utilization of such synthetic resinous screen material of the type above described for outside construction of chairs and backs and other furniture and materials which previously has had a netted or caned surface of any other type.

Another object of this invention is to provide a flexible screen cloth preferably made of synthetic resinous material which may be cut and secured at spaced predetermined intervals.

A further object of the present invention is the provision of a screen cloth of the type above described as a support for or as a substitute for other types of webbing in unholstered materials.

Still another object of the present invention is the utilization and construction of such screen material in self-supporting or self-containing structures such as bed springs, hammocks, gliders and similar articles wherein the screening or webbing forms the major or almost the entire portion of the furniture itself.

Since nylon is the preferred material with which all of these functions may be accomplished, it will be referred to as such throughout the entire description, but it should be understood that nylon is set forth and described merely as a generic form of material and that wherever nylon is herein referred to, it should be understood that any thermo-plastic or thermo-setting or otherwise thermo-sensitive, synthetic, non-metallic, organic or inorganic, elastic, flexible material may be used.

Many other objects and uses of the present invention will be in part apparent and in part pointed out in the following description and drawings, in which:

Figure 8 is a plan view of a nylon screen suitably treated to permit cutting and securing thereof at predetermined lines.

Figure 9 is an enlarged view of the weave of Figure 8 before the application of varnish or other binding material.

Figure 1:
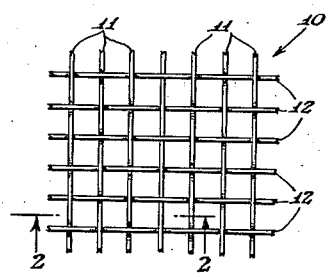
Figure 1 is a plan view of a nylon screen of the type preferred for use in connection with the present invention.
Figure 2:
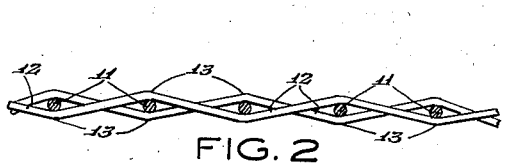
Figure 2 is a cross-sectional view taken on line 2—2 of Figure 1.

Referring now to Figures 1 and 2, I have here shown a nylon screen 10 having warp strands 11 and weft strands 12 which are interwoven with each other in the manner shown.

Preferably, and in accordance with the patent applications above mentioned, the nylon strands or other strands of synthetic, resinous material may be interwoven in any suitable manner and then thermally treated at a temperature in excess of 120° F. so that under the influence of the heat, the warp and weft strands will adopt a permanent set in relation to each other producing a series of crimps 13, 13, each at an obtuse angle.

The minimum temperatures to which the material should be heated for the production of the crimps herein described is one beyond which the material may bend or flow about the intersecting strands without fusing therewith and the highest heat limit for any material used is the melting point of the material which in the case of nylon would be 507° F.

The material is resilient at the crimps so that even though the strands may under tension be straightened out so that the crimps disappear, nevertheless upon relaxation of the tension, the crimps will be restored into their original position and since complementary crimps and intersecting strands register with each other at their respective troughs, the crimps when restored upon relaxation of any pressure or tension will tend to ride down the troughs of the complementary crimps and thus return to their original position.

This action and the construction of the screen itself is more fully described in the aforementioned copending applications.

Owing to the fact that the strands of the material are crimped in the manner above mentioned, the material may yield resiliently to any tensioning or deforming force which may be exerted thereon and upon removal of said tensioning or deforming force, the elasticity of the material will cause the crimp to be restored and the tendency of the crimps to return to trough to trough relation to each other will restore the mesh defining relationship of the strands.

For purposes of the present invention, it is preferred that single filament rods or strands of the material be used so that the inherent physical properties comprising the resilience and elasticity of the original material may be utilized for this purpose.

Where multi-filament strands are used, woven or twisted from a series of fibers, then the strands may be entirely too flexible and lose the inherent resiliency, and the elasticity may be uniformly spread through the strands.

For this reason, single filament rods or strands for retaining the original inherent properties of the original material are preferable.

The minimum thickness of any single filament rod or strand is one which is sufficiently thick to retain enough inherent resiliency to maintain a crimp once it has been formed, and to tend to restore the crimp when the crimp has been deformed.

The maximum thickness which may be used for a single filament rod or strand is one in which a crimp may be formed and which will be sufficiently resilient to restore the crimp after the crimp has been deformed by any deforming or distorting or tensioning force.

The material of which the screen of Figure 1 is made may be transparent or translucent and hence be placed over any cloth backing which may be desired without disturbing the decorative effect of the furniture to which it is applied or it may be utilized in any furniture where the transparency or translucency of the material used may be an asset.

The material may, however, be opaque if desired, and it is of such nature that it may be colored in any manner. As a matter of fact, the different strands intersecting at different points may be colored in different ways to form appropriate geometric patterns of different kinds.

The material is thus readily adaptable to interior decorative effects and may readily be utilized to blend with any bed or other type of furniture in connection with which it may be used.

The material as has above been mentioned, may be utilized in connection with springs or hammocks, with chairs, as inserts or insets for tables or table tops or other types of furniture as for instance, gliders, as grills for cabinet doors, as rollable or flexible table tops for collapsible tables of various kinds, as a webbing for upholstered furniture and for any other purpose where a strong, substantial, sturdy, resilient screen material is desirable or utilizable.

Wherein for any particular purpose an increase is desired in the resiliency of any particular screen, then additional crimps may be placed in the single filament strands intermediate the crimps 13 above described.

Figure 3:
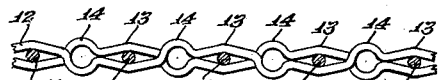
Figure 3 is a cross-sectional view corresponding to that of Figure 2 but showing a modified construction of the screen of Figure 1.

Thus for instance as seen in Figure 3, in addition to the crimps 13 which have been placed in both the warp and the weft strands, additional crimps of any desired form as, for instance, the semi-circular form 14 shown in Figure 3 may be placed intermediate successive crimps to add to the resiliency or stretchability of the screen material.

The same self-restoring principle applies to this construction and the inherent resilience and elasticity of any material which is used in the manner above described may be sufficient to restore not merely the crimps 13 but also the crimps 14 to their original position after any tension or deforming force is removed therefrom.

By the placing of such additional intermediate crimps 14 of any desired shape intermediate the intersection of any particular strand with intersecting strands, the resilience or elasticity or stretchability of the strands in which such crimps are placed is greatly enhanced.

For particular purposes where a stretch in one direction greater than that in the other direction is desired, such intermediate crimps 14 may be placed only in the strands (either the warp or the weft) running in a particular direction.

Where desired or useful, however, the intermediate crimps 14 of any suitable shape or form may be placed in both the warp and the weft strands. Any deformation of the mesh itself caused by the insertion of a solid object into the mesh will be immediately repaired upon the removal of the deforming force by the tendency of the complementary crimps to be self-restoring with respect to each other.

Any end tension, however, tending to stretch the material will have its greatest effect upon the additional crimps 14 as well as upon the crimps 13 and the cumulative effect of the slight straightening out of each of the crimps 14 will manifest itself in an increased resiliency or springiness of the entire web or mesh.

Figure 4:
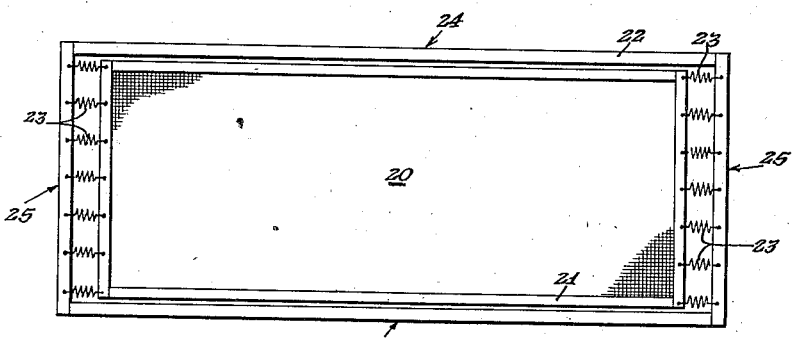
Figure 4 is a plan view of a bed spring made with the nylon screen of Figure 1.

Thus, for instance, as seen in Figure 4, a construction of the type of Figures 2 or 3 when made of strands which are sufficiently thick may be utilized as a bed spring in which case a screen 20 made in accordance with the process above-described and having elements of the type above-described and bound by a frame or binding tape 21 which may be applied, if desired, in accordance with the disclosure of the application of H. W. Thomas for screen frames, Serial No. 324,394, filed simultaneously herewith. It may be mounted within an outer spring frame 22 either by being directly attached thereto or by being connected thereto by a series of springs 23 interconnecting the frame 21 and the frame 22.

The bed spring of the type shown in Figure 4 may be manufactured and made as a single rectangular unit for use in connection with beds or may be the top portion of a cot or folding bed of any desired material.

For purposes of foldability where the bed spring of the type shown in Figure 4 is to be utilized in connection with a cot or folding bed, the outer frame 22 may be foldable at the points indicated by the arrows 24, 24, 25, 25 or at either set of points, and the inner frame or binding 21 of the spring screen 20 may be foldable at similar points. Or the inner tape or binding 21 may be as elastic and flexible and foldable as the screen material itself, in which case no special provision need be made for folding or winding or rolling or other collapsing of the screen frame 21.

Owing to the inherent resilience of the material thus used, an extremely comfortable spring base for a bed or cot may thus be formed or an extremely comfortable spring for an ordinary bed upon which a mattress is to be placed may thus be created.

Owing to the fact that the material of which the screen of Figures 1 to 3 is formed is not only inherently resilient but flexible as well, it may be used in furniture where flexibility is either a requirement or an asset.

Figure 5:
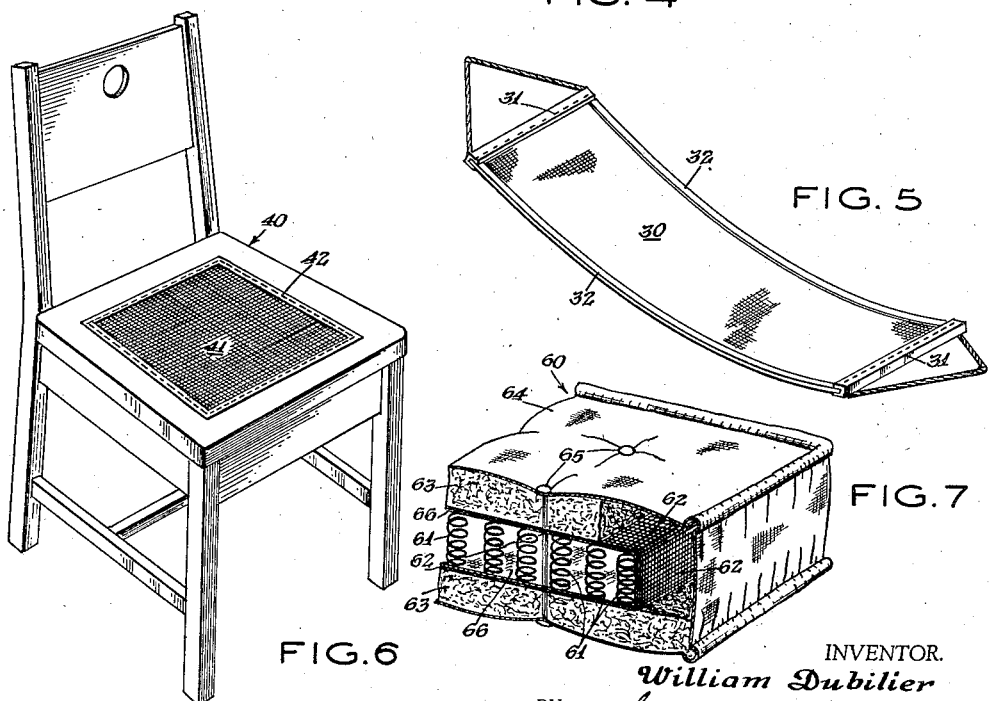
Figure 5 is a view in perspective of a hammock made with the screen material of Figure 1.

Thus, for instance, the screen of Figures 2 or 3 may be utilized to form the hammock of Figure 5 in which the screen material 30 may be bound at each of the narrow ends by a stiff binding strip 31, 31 in the manner in which a hammock is ordinarily bound and in which the lateral ends may be bound with flexible material 32.

Each of the bindings 31 and 32 may be affixed to the screen material in the manner described in the copending application above mentioned of H. W. Thomas for screen frames.

The inherent flexibility and resilience of the material makes it possible to create extremely comfortable hammocks or swings or other articles wherein flexibility and resilience of the material is an asset.

It should be noted that the utilization of nylon for this purpose strengthens rather than weakens the structure to which it is applied, since the high tensile strength of nylon compares favorably with that of metal while nylon is more readily capable of being resiliently deformed from a predetermined set and returning to such predetermined set upon the removal of the deforming or the tensioning force.

Figure 6:
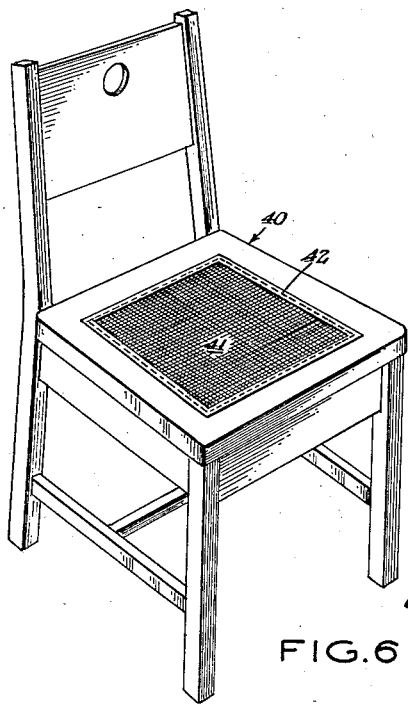
Figure 6 is a view in perspective of a chair, a portion of which is made with the nylon screen material of Figure 1.

Owing to the fact further that nylon may be either translucent or transparent or may be colored in any suitable manner to fit in with any interior decorative scheme or with any furniture scheme of any type whatever, the nylon may be used as a caning or netting for backs and chairs and other types of furniture. Thus as seen in Figure 6, the chair 40 has a cane seat 41 comprising a nylon screen made in accordance with the structure of Figures 2 and 3 and either bound with a frame 42 in the manner described in the application of H. W. Thomas for screen frames above mentioned and the frame then imbedded in the seat of the chair or the screen may be mounted in a recess of the seat of the chair and a top framing or binding means may be inserted in the recess and nailed or screwed thereto in any suitable manner in order to mount the member 41 in the chair.

The structural resilient and elastic characteristics above described have equal utility for the use shown in Figure 6. Obviously the use of nylon material is not necessarily restricted to the outer portions or visible portions of the furniture and thus the nylon mesh may be mounted on the under side of the chair seat and may form a support for the upholstery of the chair seat or back or may form an interior or exterior webbing for a cushion or may form a dust or lint excluding screen beneath an upholstered seat of any type.

Figure 7:
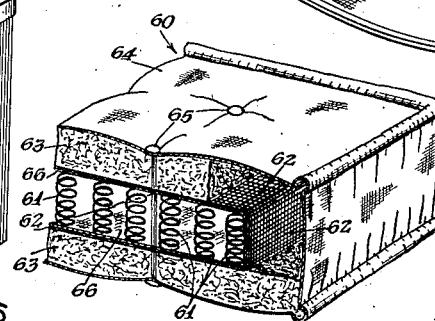
Figure 7 is a cross-sectional view partly in perspective of an inner spring upholstered mattress made with a webbing of nylon mesh of the type of Figure 1.

I have preferred to illustrate in Figure 7 only one such use, although other uses of this type may be obvious from the foregoing disclosures.

In Figure 7 I have shown a cross-section of an inner spring mattress 60 having a series of inner springs 61 held between two nylon screen layers 62, the nylon screen layers binding or defining the elastic limits of the springs and maintaining an evenness of the ends of the springs.

The nylon screen layers and the springs may be bound together in any suitable manner to form a single virtually integral unit for use as the inner spring structure of the mattress. The upholstery or stuffing 63 may be then placed upon or sewn to the nylon screen in any suitable manner now known to the art and the outer layer or covering 64 may then be bound down to the nylon screen layer in any suitable manner as by the tufting 65.

By reason of the fact that the nylon screen used in this connection is inherently flexible and resilient, the use thereof increases the resiliency and flexibility of the mattress or other upholstery material in which it is used, while at the same time strengthening said mattress or upholstered furniture.

In Figure 8 I have shown a screen cloth 70 woven in accordance with the crimped structure described in connection with Figures 1, 2 and 3. The said screen cloth, however, as is seen at 71 of Figures 8 and 9 is closely woven at the edges and is at various intervals at 72 also closely woven transversely.

These closely woven portions may then be varnished or coated with binder material to prevent unravelling.

The closely woven and bound transverse portions 72 are spaced at predetermined intervals corresponding to lengths which are normally used in furniture construction and the screen material 70 may be transversely cut along line a—b (Figure 8) along the closely woven and varnished or otherwise coated portion 72 when it is desired to cut the material to a suitable length.

Upholsterers or other furniture manufacturers may thus buy screen cloth suitable for furniture in continuous rolls and may cut them along the closely woven, predetermined, bound portions to any lengths which are necessary in the particular furniture construction.

The bound edges 71 and 72 thus remaining after a suitable length has been cut from the web 70 may then be punched or otherwise treated for fastenings and will take nails, screws, stitching or other fastening material without unravelling.

In the foregoing description I have described only a few of the many furniture uses of a thermosensitive, plastic, elastic, resilient, flexible material such as nylon. Many other uses in this connection will now be suggested to those skilled in the art, and I prefer therefore to be limited not by the specific disclosure herein, but only by the appended claims.

I claim:

1. An open mesh resilient screen of a synthetic linear polyamide condensation product, said screen comprising single filament warp and weft strands of substantial thickness, permanent crimps in each of said strands, said strands being resilient about the crimp; alternate crimps being obtuse and complementarily registering at the strand intersections and intermediate crimps being spaced from said intersections.

2. Open mesh resilient screen, said screen comprising single filament warp and weft strands of substantial thickness, alternate thermally formed obtuse crimps in each of said strands, crimps in intersecting strands complementarily registering with each other, and additional crimps in the strands running in one direction intermediate the first mentioned crimps at the points of intersection.

3. An open mesh resilient screen of a synthetic linear polyamide condensation product, said screen comprising single filament warp and weft strands of substantial thickness, permanent crimps in each of said strands, said strands being resilient about the crimp; alternate crimps in certain of the strands being obtuse and complementarily registering at the strand intersections and the intermediate crimps being in said strands spaced from said intersections.

4. An open mesh resilient screen of a synthetic linear polyamide condensation product, said screen comprising single filament warp and weft strands of substantial thickness, permanent crimps in each of said strands, said strands being resilient about the crimp; alternate crimps in certain of the strands being obtuse and complementarily registering with crimps of intersecting strands at the strand intersections and the intermediate crimps being in said strands spaced from said intersections.

5. A webbing material comprising an open mesh resilient screen, said screen comprising single filament warp and weft strands of substantial thickness, alternate thermally formed obtuse crimps in each of said strands, crimps in intersecting strands complementarily registering with each other, and additional crimps in each of the warp and weft strands intermediate the first mentioned crimps at the points of intersection.

6. A webbing material, said webbing material being formed of an open mesh resilient screen formed of single filament crimped strands of thermally workable synthetic resinous material, said webbing material being more closely woven at the edges than in the body, said edges being coated with a binder material.

7. A webbing material, said webbing material being formed of an open mesh resilient screen formed of single filament crimped strands of thermally workable synthetic resinous material, said screen material being more closely woven along spaced narrow transverse areas than in the body.

8. A webbing material, said webbing material being formed of an open mesh resilient screen formed of single filament crimped strands of thermally workable synthetic resinous material, said screen material being more closely woven along spaced narrow transverse areas than in the body, and coated at said more closely woven areas with a binding material.

WILLIAM DUBILIER.